United States Patent

Nannini et al.

[11] Patent Number: 5,641,053
[45] Date of Patent: Jun. 24, 1997

[54] EQUALLY SPACED PRODUCT CONVEYING METHOD AND LINE

[75] Inventors: Luciano Nannini, Casalecchio; Giulio Strazzari, Bologna, both of Italy

[73] Assignee: Azionaria Costruzioni Macchine Automatiche A.C.M.A. S.p.A., Bologna, Italy

[21] Appl. No.: 554,227

[22] Filed: Nov. 8, 1995

[30] Foreign Application Priority Data

Nov. 11, 1994 [IT] Italy ................... BO94A0497

[51] Int. Cl.$^6$ ................... B65G 47/31
[52] U.S. Cl. ................... 198/461.3; 198/461.1; 198/471.1
[58] Field of Search ................... 198/461.1, 461.2, 198/461.3, 459.8, 459.1, 431, 432, 471.1

[56] References Cited

U.S. PATENT DOCUMENTS

| | | | |
|---|---|---|---|
| 3,941,233 | 3/1976 | Aiuola | 198/471.1 |
| 3,993,188 | 11/1976 | Müller | 198/461.3 |
| 4,934,510 | 6/1990 | Lutgendorf | 198/461.3 |
| 5,096,043 | 3/1992 | Gorrieri et al. | 198/461.1 |

FOREIGN PATENT DOCUMENTS

| | | | |
|---|---|---|---|
| 0371474 | 6/1990 | European Pat. Off. | 198/471.1 |
| 0608823 | 8/1994 | European Pat. Off. | |
| 7009250 | 12/1971 | Netherlands. | |
| 553709 | 9/1974 | Switzerland. | |
| 2013599 | 8/1979 | United Kingdom. | |

Primary Examiner—James R. Bidwell
Attorney, Agent, or Firm—Ladas & Parry

[57] ABSTRACT

A method and line for feeding products in equally spaced manner to a user machine, whereby the products, aligned and traveling with a constant spacing and at constant speed along a supply path, are each removed off the supply path by a respective gripping unit for initially accelerating the product and then feeding it with the above spacing and at the above speed into a respective pocket on the input conveyor of the user machine.

11 Claims, 4 Drawing Sheets

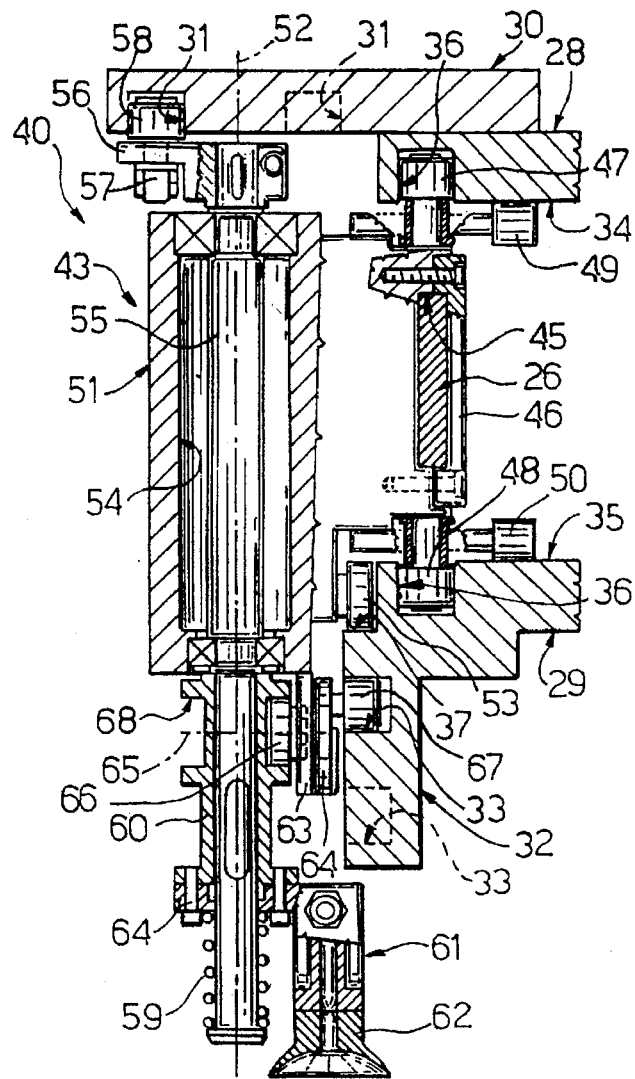
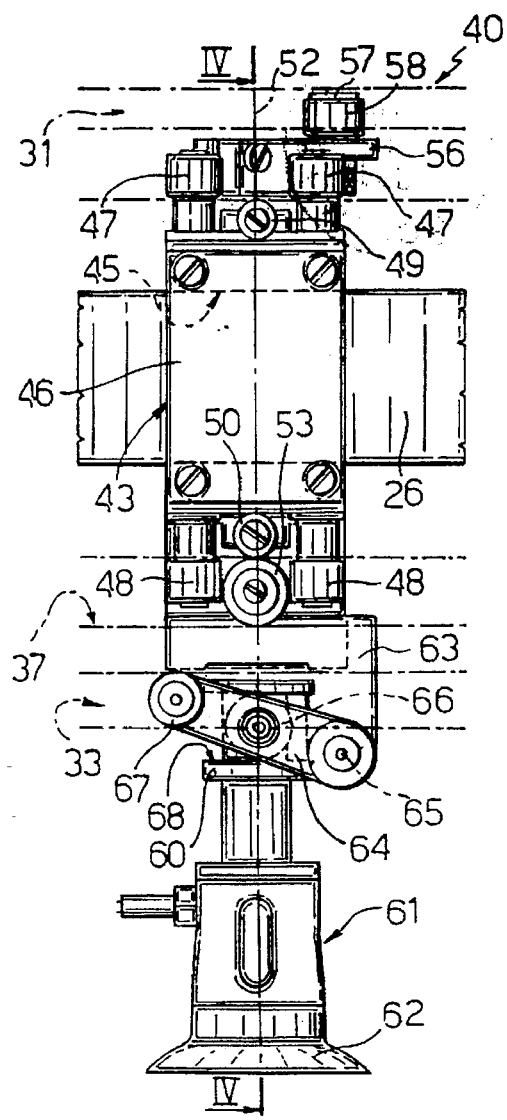
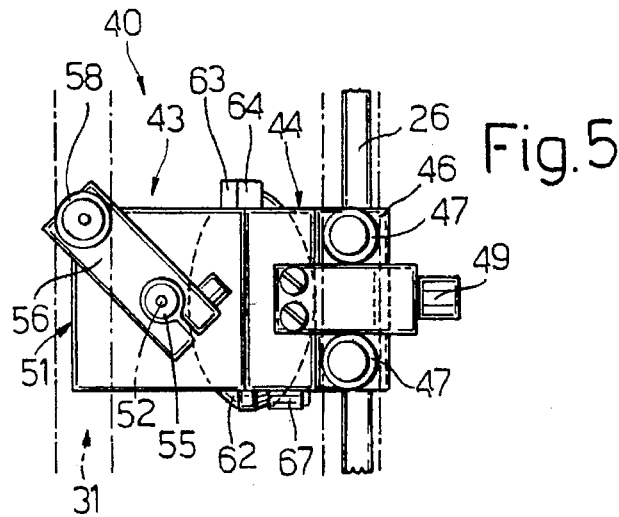
Fig. 4
Fig. 3
Fig. 5

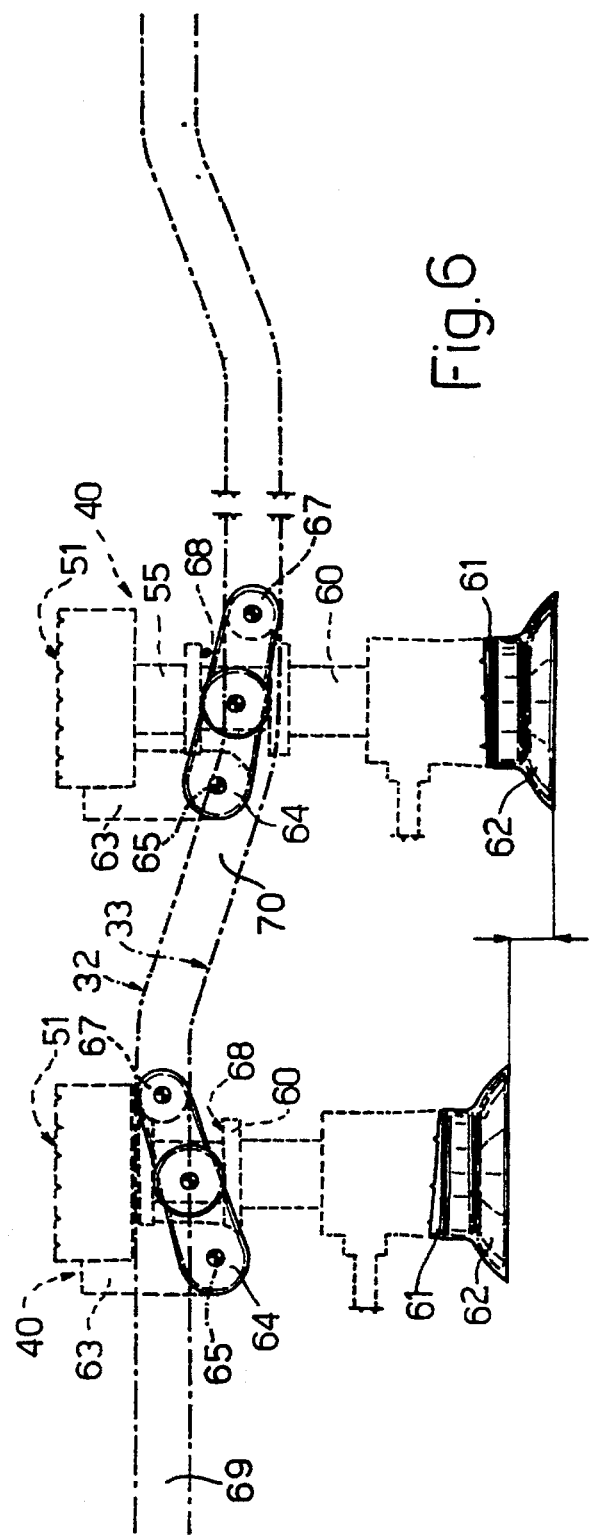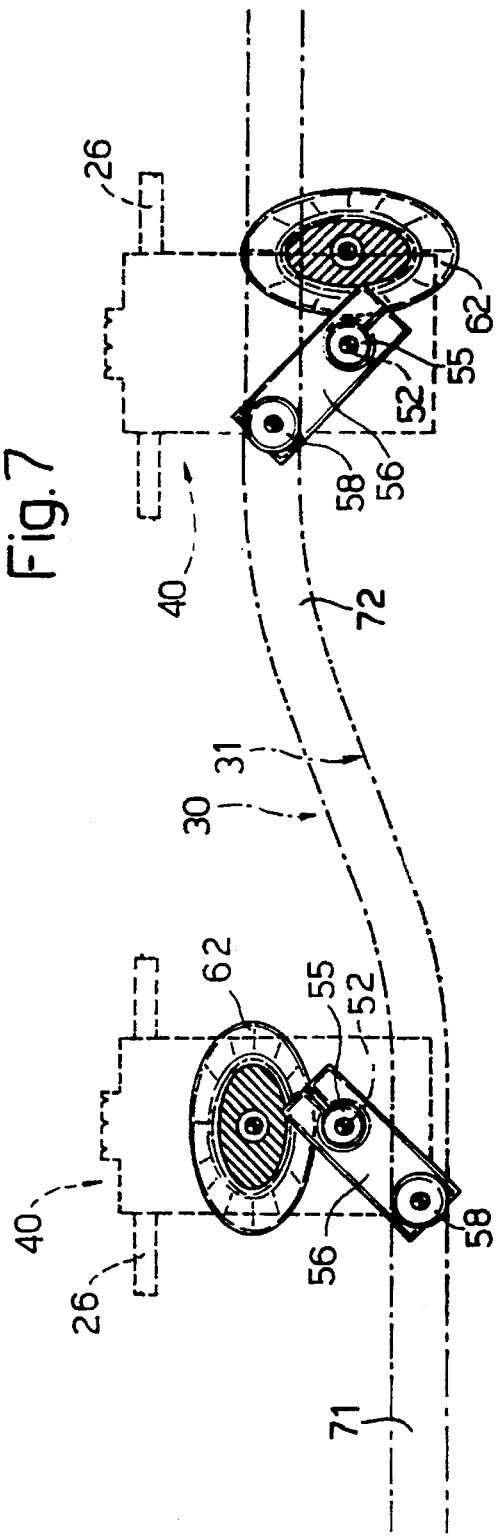

EQUALLY SPACED PRODUCT CONVEYING METHOD AND LINE

BACKGROUND OF THE INVENTION

The present invention relates to a method of conveying products in equally spaced manner.

More specifically, the present invention relates to a method of conveying products in equally spaced manner to a user machine.

The present invention is especially suitable for use in the manufacture of soap or similar, to which specific reference is made in the following description purely by way of example.

In the soap industry, cakes of soap are supplied in equally spaced manner to a user machine, e.g. a wrapping machine, which presents an input conveyor traveling in a feed direction at a given substantially constant speed, and in turn normally presenting a succession of equally spaced pockets, each for housing a respective cake of soap.

The cakes are normally fed in orderly fashion to the input conveyor by a feed line of which the input conveyor forms the output element; and known feed lines normally comprise an ordering conveyor for conveying a succession of cakes at substantially constant speed by means of equally spaced pushers traveling with the ordering conveyor, and a transfer device for successively transferring the cakes from the output end of the ordering conveyor into respective pockets on the input conveyor.

The transfer device of known feed lines of the above type is normally defined by an overhead conveyor located over the output end of the ordering conveyor and the input end of the input conveyor, and presenting a succession of gripping heads successively cooperating with the cakes on the ordering conveyor, which normally comprises at least one endless belt fitted with the pushers. In general, each gripping head engages the respective cake just before the pusher rotates about the guide pulley of the belt to pass from the transportation branch to the return branch of the belt. Consequently, if the pushers project considerably outwards of the belt in relation to the thickness of the cakes, each pusher, as it rotates about the guide pulley, may possibly collide downwards with the cake that has just been removed, and so detach it from the gripping head.

To overcome the above drawback, known feed lines of the above type are normally specially designed for a given type of cake, i.e. the height of the pushers is normally determined as a function of the size of the cake being produced.

SUMMARY OF THE INVENTION

It is an object of the present invention to provide a method of feeding products, in particular cakes of soap, in equally spaced manner to a user machine, in particular a wrapping machine, which not only provides for overcoming the aforementioned drawback, but which may also be applied to cakes of any size.

According to the present invention, there is provided a method of feeding products in equally spaced manner to a user machine presenting an input conveyor traveling in a feed direction at a first given substantially constant speed, and in turn presenting an orderly succession of pockets arranged with a first given spacing along a first given path; the method comprising an ordering stage wherein mutually aligned products are fed to the input of an ordering conveyor presenting an orderly succession of pushers moving substantially in said feed direction at a second given substantially constant speed along a second path, and arranged with a second given spacing along said second path; and a transfer stage wherein each product is transferred from the output of the ordering conveyor to a respective pocket on the input conveyor along a third path and by means of a transfer device; characterized in that the second speed is at least equal to the first speed, and said first and second spacings present the same relationship as said first and second speeds, so that the two conveyors operate at the same rate; said transfer stage comprising the substages of removing the products from the second path at a speed equal to said second speed; feeding the products successively with said second spacing along said third path; and accelerating the products along at least an initial portion of the third path.

According to a preferred embodiment of the above method, the two conveyors are offset in relation to each other by a given phase angle; the products being accelerated along at least said initial portion of the third path to compensate for said phase angle.

The present invention also relates to a line for feeding products, in particular cakes of soap, in equally spaced manner to a user machine, in particular a wrapping machine.

According to the present invention, there is provided a line for feeding products in equally spaced manner to a user machine; the line comprising a first conveyor traveling in a feed direction at a first given substantially constant speed, and presenting an orderly succession of pockets arranged with a first given spacing along a first given path, the first conveyor being the input conveyor of the user machine; an ordering conveyor for receiving a succession of aligned products, and presenting an orderly succession of pushers moving substantially in said feed direction at a second given substantially constant speed along a second path, and arranged with a second given spacing along the second path; and a transfer device for successively transferring the products from the output of the ordering conveyor to respective pockets on the input conveyor along a third path; characterized in that the second speed is at least equal to the first speed, and said first and second spacings present the same relationship as said first and second speeds, so that the two conveyors operate at the same rate; said transfer device comprising a number of gripping units equally spaced along the third path with a spacing equal to the second spacing; a gripping head fitted movably to each gripping unit; first drive means for moving said gripping units along the third path at a speed equal to said second speed; and second drive means for moving each gripping head in relation to the respective gripping unit and in said feed direction at least at an initial portion of the third path.

BRIEF DESCRIPTION OF THE DRAWINGS

A non-limiting embodiment of the present invention will be described by way of example with reference to the accompanying drawings, in which:

FIG. 3 shows a larger-scale side view of a detail in FIG. 2;

FIG. 4 shows a section along line IV—IV in FIG. 3;

FIG. 5 shows a plan view of the FIG. 3 detail;

FIG. 6 shows a schematic side view of the FIG. 3 detail in two successive operating positions;

FIG. 7 shows a schematic view, similar to FIG. 6, of the FIG. 3 detail in two successive operating positions.

DETAILED DESCRIPTION OF THE INVENTION

Figure 1:
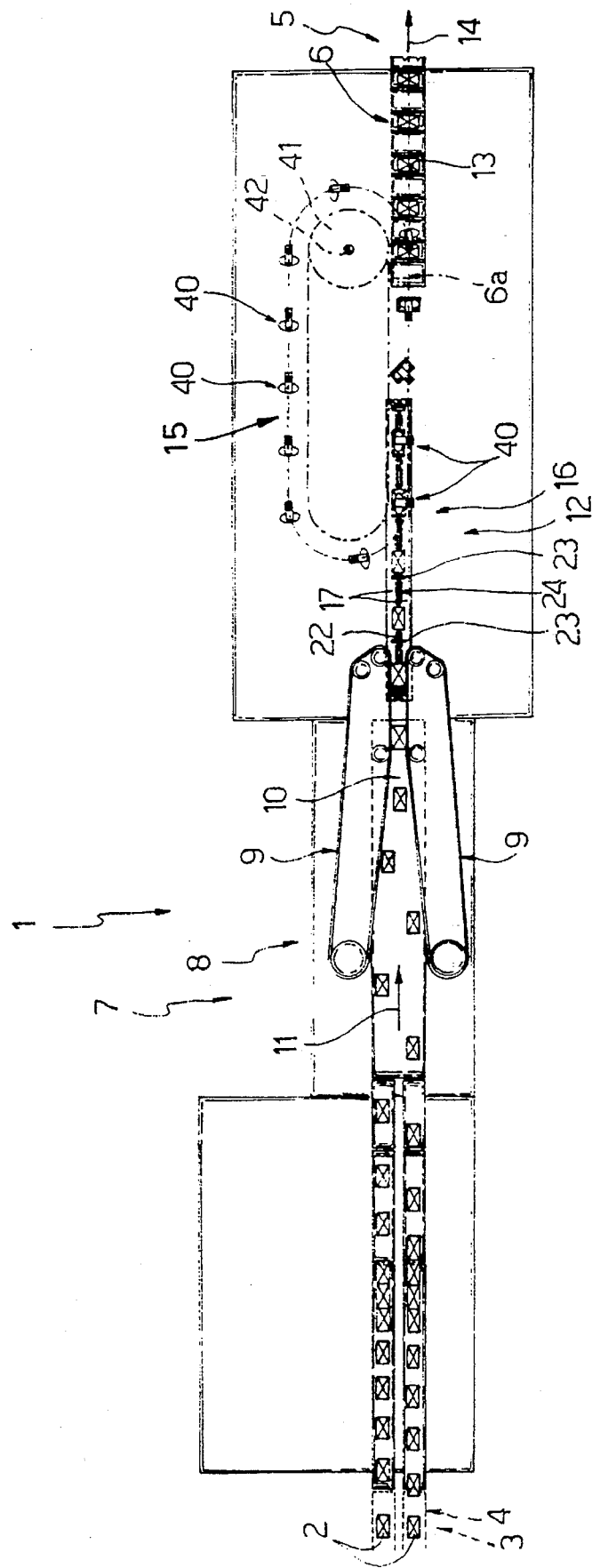
FIG. 1 shows a schematic plan view, with parts removed for clarity, of a preferred embodiment of the feed line according to the present invention.

Number 1 in FIG. 1 indicates a line for feeding substantially parallelepiped cakes of soap 2 in equally spaced manner from the dual output conveyor 3 of a molding machine 4 to the input (not shown) of a wrapping machine 5 presenting an input conveyor 6 forming the output element of line 1 and defining a path 6a along which cakes 2 are fed.

Line 1 comprises an ordering unit 7 in turn comprising a presynchronizing unit 8 for receiving cakes 2 randomly aligned in two parallel side by side columns, converting the two columns into one column 10 in known manner by means of two converging lateral conveyors 9, and feeding column 10 at a substantially constant speed V1 in a substantially horizontal direction 11. Unit 7 also comprises a synchronizing unit 12 located downstream from unit 8, and which provides for equally spacing cakes 2 in column 10 with a spacing P1, and for imparting to cakes 2 a given substantially constant speed V2 parallel to and approximately equal to but no less than speed V1.

Input conveyor 6 of machine 5 is a pocket conveyor substantially coplanar with unit 7, and which presents a number of pockets 13 equally spaced along it with a given spacing P2, and provides for feeding cakes 2 at a substantially constant speed V3 in a direction 14 parallel to direction 11. More specifically, for synchronizing unit 12 and conveyor 6 to operate at the same rate, the ratio of speeds V2 and V3 is equal to that of spacings P1 and P2.

Line 1 also comprises a transfer device 15 for transferring cakes 2 from the output of unit 12 to the input of conveyor 6.

Figure 2:
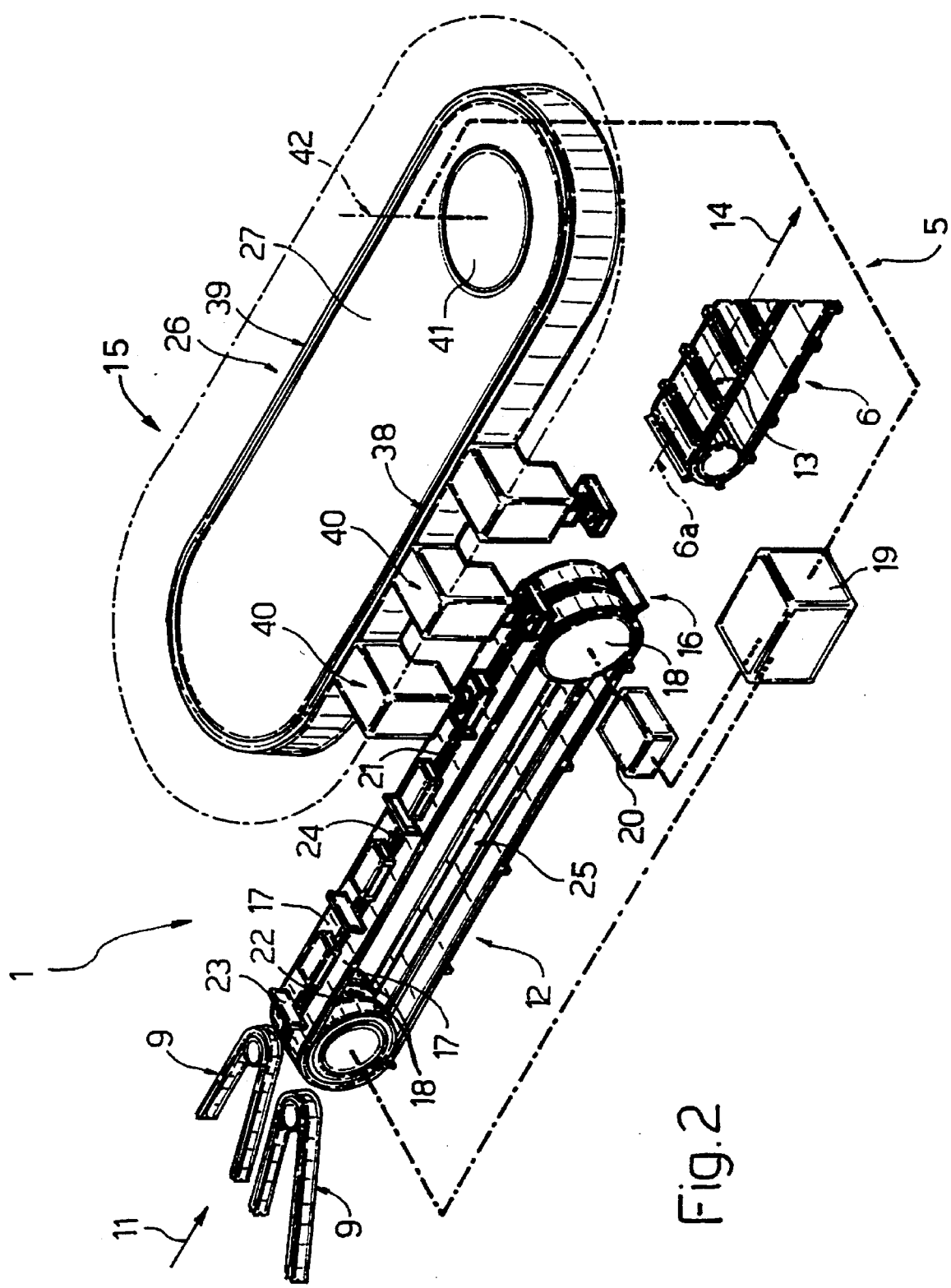
FIG. 2 shows a larger-scale view in perspective, with parts removed for clarity, of a detail in FIG. 1.

As shown particularly in FIGS. 1 and 2, unit 12 comprises an ordering conveyor 16 in turn comprising two side by side belts 17 looped about two pairs of pulleys 18, one of which is powered by drive means comprising a motor 19 and a reduction gear 20, for imparting to belts 17 a constant traveling speed equal to speed V1. Conveyor 16 also comprises a chain 21 interposed between belts 17 and looped about two pulleys 22 (only one shown in FIG. 2) coaxial with pulleys 18, and one of which is connected directly to the output of motor 19, for imparting to chain 21 a constant traveling speed equal to speed V2. Chain 21 is fitted with pushers 23 extending outwards of belts 17, and arranged with spacing P1 along a path defined by the transportation branch 24 and the return branch 25 of chain 21.

With reference to FIGS. 1 and 2, transfer device 15 comprises a conveyor belt 26 looped about a box 27 located higher than unit 12 and conveyor 6, and which is defined (FIG. 4) by a horizontal top plate 28 and a horizontal bottom plate 29, both substantially rectangular in shape and rounded at the ends. More specifically, plate 28 is flat, and is fitted on its upper surface periphery with an annular plate projecting outwards of the edge of plate 28 and defining a face cam 30, the bottom surface of which presents an annular groove 31 shaped as described later on. Plate 29 on the other hand is fitted on its outer periphery with a downward-facing annular rib defining a drum type cam 32, the outer surface of which presents an annular groove 33 shaped as described later on. The facing surfaces 34 and 35 of plates 28 and 29 present respective identical grooves 36 parallel to the outer periphery of plates 28 and 29; and a further annular groove 37 is formed in surface 35, along the edge connecting plate 29 and cam 32.

Belt 26 extends in the gap between plates 28 and 29, and comprises a path defined by a work branch 38 and a return branch 39 arranged side by side in a horizontal plane and fitted with gripping units 40. Units 40 are equally spaced along belt 26 with spacing P1, and, by means of a pulley 41 with a vertical axis 42, fitted to plates 28 and 29, and rotated anticlockwise (in FIG. 2) by motor 19, are advanced at speed V2 and in time with pushers 23 to transfer cakes 2 successively from the output end of unit 12 to respective pockets 13 on conveyor 6.

As shown particularly in FIGS. 3, 4 and 5, each unit 40 is fitted to belt 26 on box 27, and is guided by belt 26 about the periphery of plates 28 and 29; for which purpose, each unit 40 comprises a hollow, substantially L-shaped vertical body 43 in turn comprising a substantially horizontal first arm 44 perpendicular to belt 26 and to axis 42, and presenting on its free end a horizontal groove 45 engaged by a respective portion of belt 26, which is clamped on to arm 44 by an outer fastening plate 46. From arm 44 there project outwards two upper transverse rollers 47 and two lower transverse rollers 48, which engage respective grooves 36 to guide unit 40 about the periphery of box 27. From arm 44 there also project outwards an upper axial roller 49 and a lower axial roller 50, which respectively cooperate with surfaces 34 and 35 to guide belt 26.

Body 43 also comprises a second arm 51 extending downwards from the end of arm 44 opposite that connected to belt 26, and presenting a vertical axis 52 parallel to axis 42. Arm 51 presents an outer transverse roller 53 facing box 27 and engaging groove 37 in rotary manner to support the weight of unit 40 on plate 29, and presents an axial through hole 54 along which extends the intermediate portion of a shaft 55 coaxial with axis 52 and supported for rotation by arm 51 via the interposition of bearings.

The top portion of shaft 55 projects from hole 54 and is fitted with a lever 56, which extends crosswise to axis 52 beneath cam 30, and is fitted with a pin 57 parallel to axis 52 and supporting for rotation a tappet roller 58 engaging groove 31 to control the angular position of shaft 55 about axis 52. The bottom portion of shaft 55 projects from hole 54 and is fitted—in angularly fixed and axially downward sliding manner in opposition to a spring 59—with a sleeve 60, the bottom end of which, engaged by spring 59, is fitted with an appendix 61 extending crosswise to axis 52 beneath cam 32, and in turn fitted with a suction cup type gripping head 62 extending parallel to axis 52 and downwards from the free end of appendix 61. Groove 31, roller 58 and lever 56 define actuating means for moving gripping head 62 in relation to unit 40 and in said direction 14.

As shown more clearly in FIG. 3, arm 51 presents an axial appendix 63 extending downwards from the bottom end of arm 51 and alongside sleeve 60 in the gap between sleeve 60 and cam 32, and to the free end of which is hinged a lever 64 pivoting about an axis 65 parallel to rollers 49 and 50, and supporting for rotation an intermediate roller 66 and an end roller 67, both parallel to axis 65. Intermediate roller 66 engages an annular groove 68 formed on the outer surface of sleeve 60, and roller 67 is a tappet roller engaging groove 33 of cam 32 to control the axial position of sleeve 60 and hence of gripping head 62 along shaft 55.

Operation of line 1 will now be described as of the instant in which cakes 2, substantially aligned into column 10 by lateral conveyors 9 of presynchronizing unit 8 and traveling along unit 8 at speed V1, are fed successively to the input of synchronizing unit 12.

For the sake of simplicity, each cake 2, in passing from unit 8 to unit 12, is assumed to be deposited on to a portion of belts 17 corresponding at the time to a portion of transportation branch 24 of chain 21 extending between two pushers 23.

Each cake 2 passes smoothly and with no slippage from unit 8 to unit 12 by virtue, as stated, of belts 17 traveling at the same speed V1 as cakes 2 along unit 8; and, since the transportation branch 24 of chain 21 travels at speed V2 greater than speed V1, each pusher 23, as it travels along branch 24, gradually catches up with the cake 2 in front of it in direction 11, and not only causes it travel at constant speed V2, but also spaces it equally with spacing P1 in relation to cakes 2 in front of it in direction 11. In other words, by the time they reach the output end of unit 12, cakes 2 travel with respective pushers 23 at constant speed V2, and are equally spaced with spacing P1 of pushers 23.

Conveyor 16 and transfer device 15 are so synchronized that each cake 2, as it is fed at speed V2 by respective pusher 23 along the output end portion of branch 24 of chain 21, is fed in direction 11 directly beneath head 62 of a gripping unit 40 of transfer device 15, the operation of which will now be described with reference to FIGS. 6 and 7, relative to one unit 40 and a respective cake 2 on unit 12, and as of the instant in which cake 2 moves into the position, close to the output end of branch 24 of chain 21, in which it is picked up by unit 40.

When unit 40 is located upstream from said pickup position, roller 67 travels along a raised flat portion 69 of groove 33 so that head 62 is maintained in the raised position (FIG. 4) over cake 2 on unit 12. Just before reaching the pickup position, roller 67 engages a downward-sloping portion 70 of groove 33, so that lever 64 rotates downwards about axis 65, and head 62 moves down in opposition to spring 59 to contact cake 2, which is engaged and carried by unit 4 off the end of unit 12.

The instant cake 2 is detached from belts 17, roller 58 of gripping unit 40 passes from a straight portion 71 of groove 31 to an inclined portion 72 which, by means of lever 56, rotates head 62 roughly 90° about axis 52 and in the same direction as speed V2. In other words, the above rotation of head 62 not only causes it to move laterally in relation to direction 11 by a distance equal to the length of lever 64, but also accelerates it forwards to enable it to detach cake 2 from pusher 23 at the precise instant in which cake 2 is detached from belts 17 and pusher 23 starts moving about the periphery of output pulley 22, thus preventing pusher 23 from colliding with cake 2 as it is picked up by gripping head 62.

Once rotated as described above, head 62 travels towards conveyor 6 at speed V2, and releases cake 2 inside a pocket 13 of conveyor 6, the traveling direction 14 of which is offset in relation to direction 11 by a distance equal to the lateral displacement of cake 2 as it is rotated. To compensate for the acceleration of cake 2 as it is rotated, conveyor 6 must obviously operate in advance of conveyor 16, to compensate for the forward movement imparted to cake 2 as it is rotated.

On releasing cake 2 inside pocket 13, head 62 is restored to the raised position, and is rotated 90° in relation to the carrying position, ready for the next cycle.

We claim:

1. A method of feeding products (2) in equally spaced manner to a user machine (5) having an input conveyor (6) traveling in a feed direction (14) at a first given substantially constant speed (V3), and comprising an orderly succession of pockets (13) arranged with a first given spacing along a first given path (6a); the method comprising an ordering stage wherein mutually aligned products (2) are fed to the input of an ordering conveyor (16) comprising an orderly succession of pushers (23) moving substantially in said feed direction (14) at a second given substantially constant speed (V2) along a second path (24), and arranged with a second given spacing (P1) along said second path (24); and a transfer stage wherein each product (2) is transferred from the output of the ordering conveyor (16) to a respective pocket (13) on the input conveyor (6) along a third path (38) and by means of a transfer device (15); the second speed (V2) being at least equal to the first speed (V3), and said first and second spacings (P2, P1) presenting the same relationship as said first and second speeds (V3, V2), so that the two conveyors (16, 6) operate at the same rate; said transfer stage comprising the substages of removing the products (2) from the second path (24) at a speed equal to said second speed (V2); feeding the products (2) successively with said second spacing (P1) along said third path (38); and accelerating the products (2) along at least an initial portion of the third path (38); the products (2) being fed along said third path (38) by gripping them by means of respective gripping heads (62) of respective gripping units presenting respective axes (52) crosswise to said feed direction (14), arranged with said second spacing (P1) along the third path (38), and traveling at said second speed (V2) along the third path (38); each gripping head (62) being located a given distance from the respective said axis (52); and each product (2) being temporarily accelerated by rotating the respective gripping head (62) by a given angle about the respective said axis (52) and in the same direction as said feed direction (14).

2. A method as claimed in claim 1, wherein said two conveyors (16, 6) are offset by a given phase angle; the products (2) being accelerated along at least said initial portion of the third path (38) to compensate said phase angle.

3. A method as claimed in claim 2, wherein said input conveyor (6) operates in advance of said ordering conveyor (16) by said phase angle.

4. A method as claimed in claim 1, wherein each product (2) is accelerated as soon as it is engaged by said gripping head (62).

5. A method as claimed in claim 1, wherein said angle of rotation is an angle of substantially 90°.

6. A line for feeding products (2) in equally spaced manner to a user machine (5); the line (1) comprising a first conveyor (6) traveling in a feed direction (14) at a first given substantially constant speed (V3), and comprising an orderly succession of pockets (13) arranged with a first given spacing (P2) along a first given path (6a), the first conveyor being the input conveyor (6) of the user machine (5); an ordering conveyor (16) for receiving a succession of aligned products (2), and comprising an orderly succession of pushers (23) moving substantially in said feed direction (14) at a second given substantially constant speed (V2) along a second path (24), and arranged with a second given spacing (P1) along the second path (24); and a transfer device (15) for successively transferring the products (2) from the output of the ordering conveyor (16) to respective pockets (13) on the input conveyor (6) along a third path (38); the second speed (V2) being at least equal to the first speed (V3), said first and second spacings (P2, P1) presenting the same relationship as said first and second speeds (V3, V2), so that the two conveyors (16, 6) operate at the same rate; said transfer device (15) comprising a number of gripping units (40) equally spaced along the third path (38) with a spacing equal to the second spacing (P1); a gripping head (62) fitted movably to each gripping unit (40); first drive means (19) for moving said gripping units (40) along the third path (38) at a speed equal to said second speed (V2); and second drive means (31, 58, 56) for moving each gripping head (62) in relation to the respective gripping unit (40) and in said feed direction (14) at least at an initial portion of the third path (38); the gripping units (40) having respective axes (52) extending crosswise to said feed direction (14), arranged with said second spacing (P1) along the third path (38), and traveling at said second speed (V2) along the third path (38); each gripping head (62) being parallel to and a given distance from the respective said axis (52); and said second drive means (31, 58, 56) rotating each gripping head (62) by a given angle about the respective said axis (52) and in the same direction as said feed direction (14).

7. A line as claimed in claim 6, wherein said two conveyors (16, 6) are offset by a given phase angle; the movement imparted to the products (2) along at least said initial portion of the third path (38) being such as to compensate said phase angle.

8. A line as claimed in claim 7, wherein said input conveyor (6) operates in advance of said ordering conveyor (16) by said phase angle.

9. A line as claimed in claim 6, wherein said second drive means (31, 58, 56) comprise cam means (30) extending along the third path (38); and tappet means (58) fitted to each said gripping unit (40) and cooperating with said cam means (30); said cam means (30) being so formed as to rotate each gripping head (62) at the input end of said third path (38).

10. A line as claimed in claim 6, wherein said angle of rotation is an angle of substantially 90°.

11. A line as claimed in claim 6, wherein said two conveyors (16, 6) are parallel, and are offset laterally in relation to each other by a distance at most equal to the distance between each gripping head (62) and the respective said axis (52).

* * * * *